(12) United States Patent
Pili et al.

(10) Patent No.: US 7,503,344 B2
(45) Date of Patent: Mar. 17, 2009

(54) HIGH PRESSURE METERING VALVE

(75) Inventors: Roger R. Pili, Madison, WI (US); Paul Hohensee, Germantown, WI (US); Edmond Charles Miniatt, Randolph, WI (US)

(73) Assignee: Actuant Corporation, Butler, WI (US)

( * ) Notice: Subject to any disclaimer, the term of this patent is extended or adjusted under 35 U.S.C. 154(b) by 526 days.

(21) Appl. No.: 10/558,120

(22) PCT Filed: Jun. 2, 2004

(86) PCT No.: PCT/US2004/017082

§ 371 (c)(1),
(2), (4) Date: Nov. 23, 2005

(87) PCT Pub. No.: WO2004/109122

PCT Pub. Date: Dec. 16, 2004

(65) Prior Publication Data

US 2007/0095410 A1 May 3, 2007

Related U.S. Application Data

(60) Provisional application No. 60/475,287, filed on Jun. 3, 2003.

(51) Int. Cl.
*F15B 13/04* (2006.01)
(52) U.S. Cl. .................................. 137/625.21; 251/208
(58) Field of Classification Search ............ 137/625.21; 251/208; 91/443, 447, 448
See application file for complete search history.

(56) References Cited

U.S. PATENT DOCUMENTS

| 503,244 | A | 8/1893 | Lofton |
| 707,581 | A | 8/1902 | Gregory |
| 1,850,621 | A | 3/1932 | Farmer |
| 2,852,040 | A | 9/1958 | Deardorff .................... 137/624 |
| 2,889,852 | A | 6/1959 | Dunlap |
| 3,253,616 | A | 5/1966 | McCorkle et al. ...... 137/625.21 |
| 3,329,167 | A | 7/1967 | Boettcher et al. |
| 3,677,295 | A | 7/1972 | Schultz .................. 137/596.12 |

(Continued)

OTHER PUBLICATIONS

International Search Report, From PCT/ISA/210, as issued by United States Patent and Trademark Office in Connection with PCT Application No. PCT/US04/17082.

(Continued)

*Primary Examiner*—John Rivell
(74) *Attorney, Agent, or Firm*—Quarles & Brady LLP (57) ABSTRACT

A bi-directional metering valve assembly is provided to selectively direct hydraulic fluid under high pressure to a load. The assembly includes a valve block defining a first port that receives hydraulic fluid from a source, and a second port that directs hydraulic fluid toward a load. A rotatable valve member defines first and second apertures in an axial face that may be placed in selective communication with the first and second ports, respectively, to direct hydraulic fluid from the source to the load. At least one metering sealing assembly provides an interface between the valve block and the valve member. The metering sealing assembly includes a gasket that surrounds one of the first and second ports and defines a flange that is sized to completely overlap and seal the corresponding aperture. The valve member is operable to control the direction of fluid flow, and make fine adjustments to the hydraulic fluid flow rate.

6 Claims, 6 Drawing Sheets

U.S. PATENT DOCUMENTS

| | | | |
|---|---|---|---|
| RE30,517 E | 2/1981 | McClocklin | 137/625.21 |
| 4,431,028 A | 2/1984 | Hendrick | |
| 4,471,805 A | 9/1984 | Solie et al. | 137/596.12 |
| 4,516,606 A | 5/1985 | Worley | |
| 4,587,989 A | 5/1986 | Mayhew, Jr. | |
| 4,823,550 A | 4/1989 | Decker | 60/412 |
| 5,161,817 A | 11/1992 | Daum et al. | 280/714 |
| 5,308,040 A | 5/1994 | Torres | |
| 5,365,978 A | 11/1994 | Woods | |

OTHER PUBLICATIONS

Written Opinion of the International Searching Authority under date of Mar. 18, 2005 as issued in connection with PCT Application No. PCT/US04/17082.

International Search Report, Form PCT/ISA/210, as issued by United States Patent and Trademark Office in Connection with PCT Application No. PCT/US04/17082, Mar. 18, 2005.

Written Opinion of the International Searching Authority under date of Mar. 18, 2005 as issued in connection with PCT Application No. PCT/US04/17082, Mar. 18, 2005.

HIGH PRESSURE METERING VALVE

CROSS REFERENCES TO RELATED APPLICATIONS NOT APPLICABLE

This claims the benefit of U.S. Provisional Patent Application No. 60/475,287 filed Jun. 3, 2003, the disclosure of which is incorporated by reference as if set forth in its entirety herein.

STATEMENT REGARDING FEDERALLY SPONSORED RESEARCH

NOT APPLICABLE

FIELD OF THE INVENTION

The present invention relates to control valve assemblies, and in particular to a control valve that controls whether the hydraulic fluid flow is on or off and the rate and direction of fluid flow.

BACKGROUND OF THE INVENTION

Fluid flow control valve assemblies are commonly used for controlling the flow of a pressurized fluid, such as a hydraulic and pneumatic fluid and the like, into and out of cylinders to extend and retract a load. Conventional control valve assemblies typically include one or more intake ports that can be selectively connected between the fluid source and the load, and a fluid exhaust port that enables fluid to flow from the load into a return tank. Such valves are typically multi-positional to selectively engage one or more ports depending on the desired direction of fluid flow.

One such known fluid flow control valve assembly for operating a high pressure single acting hydraulic cylinder is disclosed in U.S. Pat. No. 4,471,805, the disclosure of which is incorporated by reference as if set forth in its entirety herein for the purposes of general valve assembly operation well known in the art. The '805 patent discloses a first valve body having a pressure port, an outlet port to a load, and a tank port that can be engaged to select the direction of hydraulic fluid flow. A control handle actuates a second valve body having four control ports to select one of several possible modes of operation (i.e., rapid advance, slow metered advance, hold, and return) to control the hydraulic flow rate.

Conventional high-pressure systems thus require two separate valve assemblies to control the motion of a cylinder, thereby increasing the complexity of the device and necessitating excess cost and resources during fabrication. A further limitation is that the design is unidirectional in that the hydraulic fluid flow rate is only controlled in one direction of fluid flow. Furthermore, construction and operation of such conventional devices is unnecessarily complex and tedious.

It would therefore be desirable to provide a single high-pressure control valve having bi-directional control of the direction of hydraulic fluid flow while also metering the rate of pressurized fluid flow through the valve.

BRIEF SUMMARY OF THE INVENTION

In one aspect, a metering valve assembly is provided that selectively directs hydraulic fluid under high pressure to a load. The valve assembly includes a valve block defining a first port that receives hydraulic fluid from a source, and a second port that directs hydraulic fluid to the load. A rotatable valve member is provided having an axially facing surface in which first and second apertures are formed that are in fluid communication with each other, and that can be placed in selective communication with the first and second ports, respectively, to direct hydraulic fluid from the source to the load. At least one metering sealing assembly provides an interface between the valve block and the axially facing surface of the valve member. The metering sealing assembly includes a gasket defining a flow path therethrough. The gasket surrounds one of the first and second ports and defines a flange that abuts the axially facing surface of the valve member and is sized to completely overlap and seal the corresponding aperture in at least one position of the valve member, and to provide continuously increasing communication between the flow path through the gasket and the corresponding aperture as the valve member is rotated toward a position in which maximum communication is provided between the flow path and the aperture.

These and other aspects of the invention are not intended to define the scope of the invention for which purpose claims are provided. In the following description, reference is made to the accompanying drawings, which form a part hereof, and in which there is shown by way of illustration and not limitation a preferred embodiment of the invention. Such embodiment does not define the scope of the invention and reference must therefore be made to the claims for this purpose.

BRIEF DESCRIPTION OF THE DRAWINGS

Preferred exemplary embodiments of the invention are illustrated in the accompanying drawings in which like reference numerals correspond to like elements throughout, and in which:

FIG. 5b is a detailed view of the valve member illustrated in FIG. 5a;

FIG. 6b is a detailed view of the valve member illustrated in FIG. 6a;

FIG. 7a is a view similar to FIG. 5a but with the valve member in a "full flow" position;

FIG. 7b is a detailed view of the valve member illustrated in FIG. 7a;

FIG. 8a is a view similar to FIG. 5a but with the valve member in a "return to reservoir" position; and FIG. 8b is a detailed view of the valve member illustrated in FIG. 8a.

DETAILED DESCRIPTION OF THE PREFERRED EMBODIMENT

Figure 1:
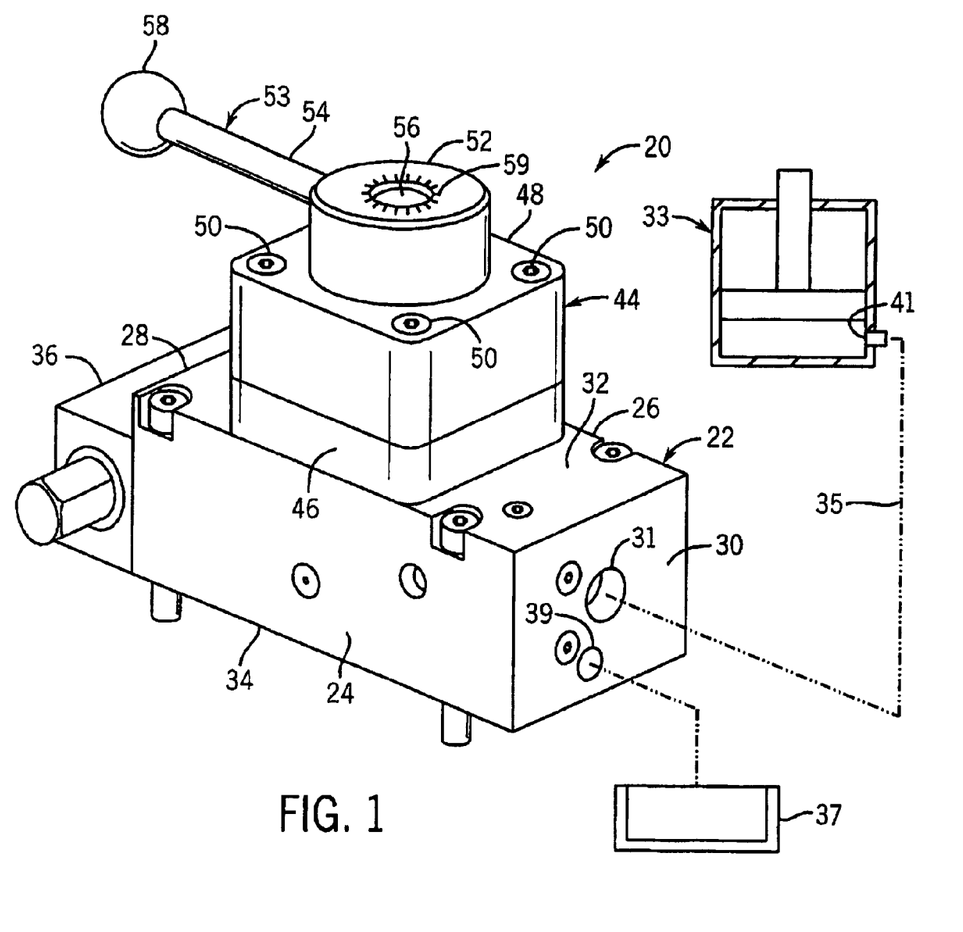
FIG. 1 is a perspective view of a control valve schematically coupled to a controlled load in accordance with a preferred embodiment of the invention.
Figure 2:
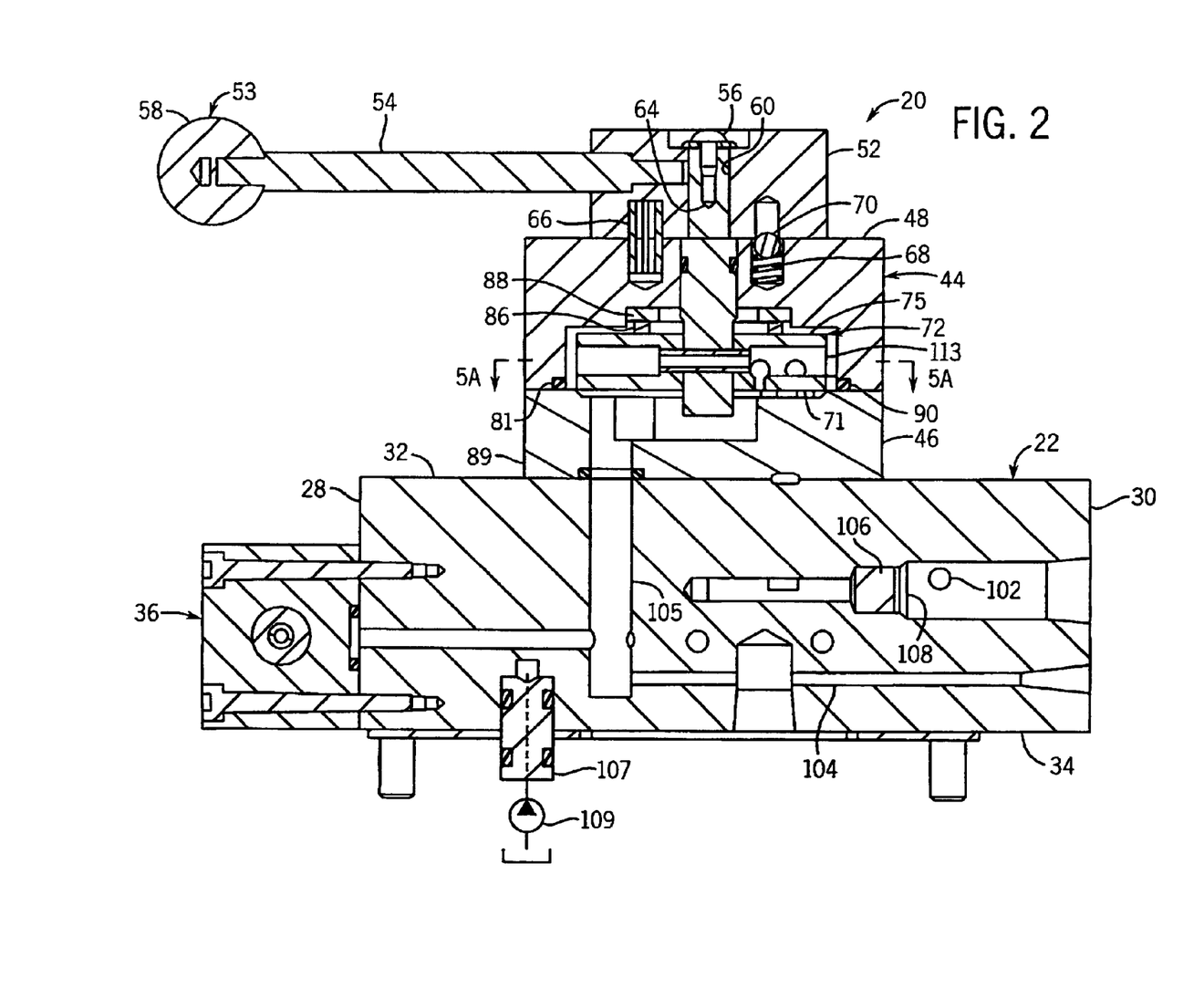
FIG. 2 is a sectional side elevation view of the control valve illustrated in FIG. 1.

Referring to FIGS. 1 and 2, a rotary control valve 20 includes an elongated rectangular manifold housing 22 at its base. Manifold housing 22 presents opposing elongated front and rear walls 24 and 26, respectively, opposing side walls 28 and 30, respectively, and upper and lower walls 32 and 34, respectively. A first opening 31 is formed in side wall 30 that is connected via a conduit 35 to a port 41 of an extendable load 33, illustrated as a hydraulic cylinder. A second opening 39 is formed in side wall 30 that is connected to a hydraulic reservoir 37. Fluid is thus supplied to port 41 via opening 31 to extend the load 33, and fluid is returned from port 41 to valve 20 via opening 31 to retract it. The returned fluid then flows through the valve 20 into hydraulic reservoir 37 via opening 39.

A pressure-compensated flow control block 36 is connected to manifold housing 22, and includes a flow control spool 38 as described in U.S. Pat. No. 4,471,805. A rectangular valve housing 44 is mounted to the upper wall 32 of manifold housing 22, and includes a lower valve block 46 connected at its upper end to a valve cap member 48 via a plurality of screws 50. A rotatable handle 53 is connected to the upper end of valve cap 48, and actuates a valve assembly 72 disposed in valve housing 44 for controlling and metering fluid flow through the control valve 20.

Figure 3:
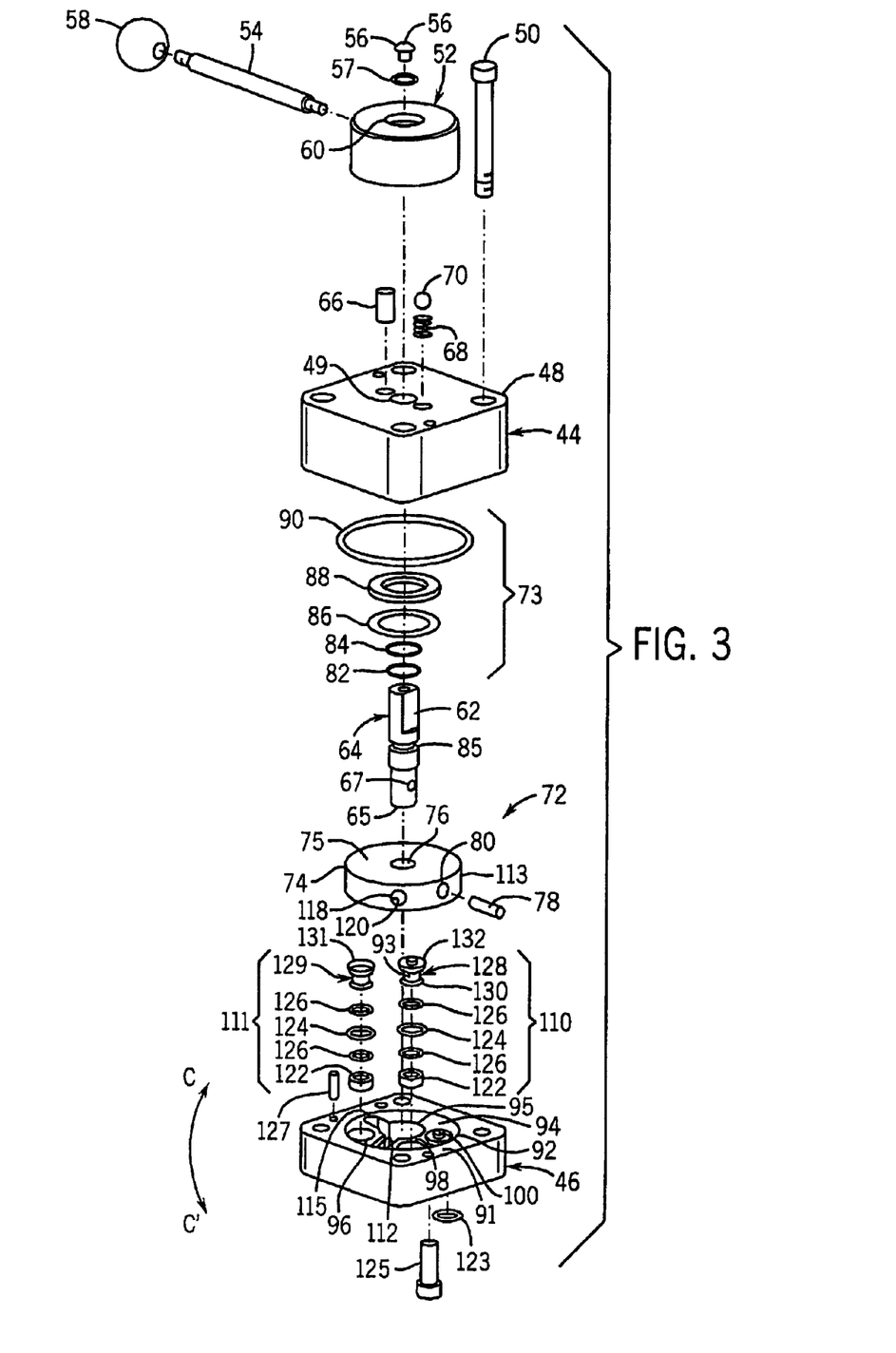
FIG. 3 is an exploded assembly view of a valve assembly portion of the control valve illustrated in FIG. 2.

Referring also to FIG. 3, the components of valve assembly 72 and handle 53 will now be described. Specifically, handle 53 includes a cylindrical disc member 52 that is rotatably mounted onto the upper surface of valve cap 48. Disc member 52 defines a cylindrical bore 60 extending axially there through that receives the upper keyed end 62 of a coupling shaft 64 to rotatably couple the shaft with disc member 52. A lever 54 extends into the radial outer wall of disc 52, and is fastened to disc 52 via a set screw 56 and washer 57 to rotatably couple lever 54 to disc 52. A knob 58 is disposed at the outer end of lever 54 that enables a user to easily rotate disc 52 during operation.

Disc 52 is coupled to valve cap 48 via a roll pin 66 along with a spring 68 and ball 70 that extend up from valve cap 48 and into disc 52 to facilitate rotation of disc 52 relative to valve housing 44. In addition, roll pin 66 along with spring 68 and ball 70 limit the degree of rotation of disc 52, and furthermore establish tactile feedback in order to positioning disc 52 in one of a plurality of distinct positions.

Valve assembly 72 controls the status (i.e. on/off) of high pressure hydraulic (or the like) fluid flow to and from load 33 along with the rate and direction of fluid flow. Control of the hydraulic fluid is achieved with a rotating cylindrical valve disc 74 disposed in valve housing 44. Specifically, valve cap 48 includes a downwardly extending shoulder 89 that encapsulates disc 74 and is connected at its lower end to the upper end of valve block 46. Valve cap 48 is fastened to valve block 46 via a plurality of screws 125 and one or more roll pins 127 that ensure proper alignment.

Disc 74 presents opposing lower and upper surfaces 71 and 75, respectively, that are joined at their outer ends to an outer radial wall 113. A central bore 76 extends vertically through the center of disc 74 in alignment with bore 60, and receives the lower end 65 of coupling shaft 64. An aperture 67 extends radially through the lower end 65 of shaft 64, and a corresponding aperture 80 extends radially through disc 74 and aligned with aperture 67. A key 78 inserted through apertures 80 and 67 rotatably locks the position of disc 74 relative to shaft 64 and handle 53. Accordingly, rotation of handle 53 correspondingly rotates disc 74 during operation.

The upper surface 75 of disc 74 engages valve cap 48 via a sealing assembly 73 that facilitates rotation of disc 74 relative to valve cap 48. Sealing assembly 73 includes an o-ring 90 disposed in a radial notch 81 formed in the radially inner edge of the lower surface of shoulder 89. A bearing plate 88 is seated against valve cap 48, and a needle bearing 86 is disposed between upper surface 75 of disc and bearing plate 88. Bearing 86 thus facilitates rotation of disc 74 relative to valve block 48 by riding along upper surface 75 of disc 74 and the lower surface of bearing plate 88, which is held stationary relative to valve cap 48. An o-ring 82 and corresponding backup washer 84 are disposed in a groove 85 extending radially into shaft 64 at a location such that o-ring 82 seals shaft 64 with respect to valve cap 48.

Valve block 46 defines a generally rectangular upper surface 91 having a centrally disposed bore 95 formed vertically therein that extends through valve block 46. Bore 95 is aligned with bore 76 of disc 74 and partially receives the lower end 65 of shaft 64. A counterbore 92 also extends into upper surface 91 to define a sunk radial flange 94 surrounding bore 95. Counterbore 92 has a diameter sufficient such that flange 94 provides a seat for disc 74.

A plurality of ports is formed in flange 94 that are coupled to a pressurized hydraulic fluid source 109, load 33, and reservoir 37. Each port can be selectively coupled to source 109, load 33, and/or reservoir 37 by a user via handle 58 to rotate disc 74 and thereby control valve operation, and to turn on and off, and meter the flow rate through valve assembly 72, as will now be described.

In particular, a first port 96 extends through flange 94 and is connected to load port 41 via a load return channel 102 that is, in turn, connected to a main channel 106, both of which extend through manifold housing 22. Port 96 is thus a load return port that enables hydraulic fluid to return from the load to the valve disc 74, which can be configured to further direct the returned fluid to tank port 39.

A second port 98 is a load supply port that extends through flange 94 at a location counterclockwise with respect to port 96. Port 98 is coupled to channel 106, and enables pressurized fluid to flow from valve housing 44 to port 31.

A third port 100 is a hydraulic fluid supply port that extends through flange 94 at a position counterclockwise with respect to port 98. Pressurized fluid source 109 supplies fluid to a connector 107 (See FIG. 2) which is coupled to fluid supply port 100 via a channel (not shown) extending through manifold housing 22. Pressurized hydraulic fluid is supplied from source 109 to port 31 when port 100 is connected to port 98 by appropriately positioning disc 74.

Three o-rings 123 (one shown) engage the lower surface of valve block 46 to seal the lower ends of ports 96, 98, and 100.

A pair of drains 112 and 115 coupled to reservoir 37 are formed from a corresponding pair of grooves formed from U-shaped cutouts extending into valve block 46 from bore 95, that extend vertically along the entire height of valve block 46. Drain 112 is located between first port 96 and second port 98, while drain 115 is located clockwise with respect to first port 96. Both drains 112 and 115 are coupled to reservoir 47 via a vertical conduit 105 linked to a channel 104 extending through manifold housing 22. Accordingly, fluid flowing into either drain 112 or 115 flows through conduit 105, travels through channel 104, and is delivered to reservoir 37.

Advantageously, a check valve 108 is disposed in channel 106 that enables unidirectional fluid flow from load supply port 98 to port 31 while preventing backflow of hydraulic fluid from port 31 towards load supply port 98. Channel 102 is connected to channel 106 at a position downstream of the check valve 108 (relative to the direction of fluid supplied to load 33 ). Accordingly, when load return port 96 (and thus channel 102 ) is closed, check valve 108 prevents backflow to hold the load 33 in an extended position when fluid flow to port 31 is discontinued. When it is desirable to retract load 33, valve assembly 72 can be actuated to permit fluid to flow from port 41 into port 31 and channel 102, bypassing check valve 108, through drain 112 or 115, and into hydraulic reservoir 37 via channel 104.

Unless stated otherwise, the terms "clockwise" and "counterclockwise" are used throughout this disclosure with reference to a top plan view of the valve assembly 72 (as shown in FIGS. 5-8) along the directions identified by Arrows C and C', respectively (FIG. 3).

Figure 4:
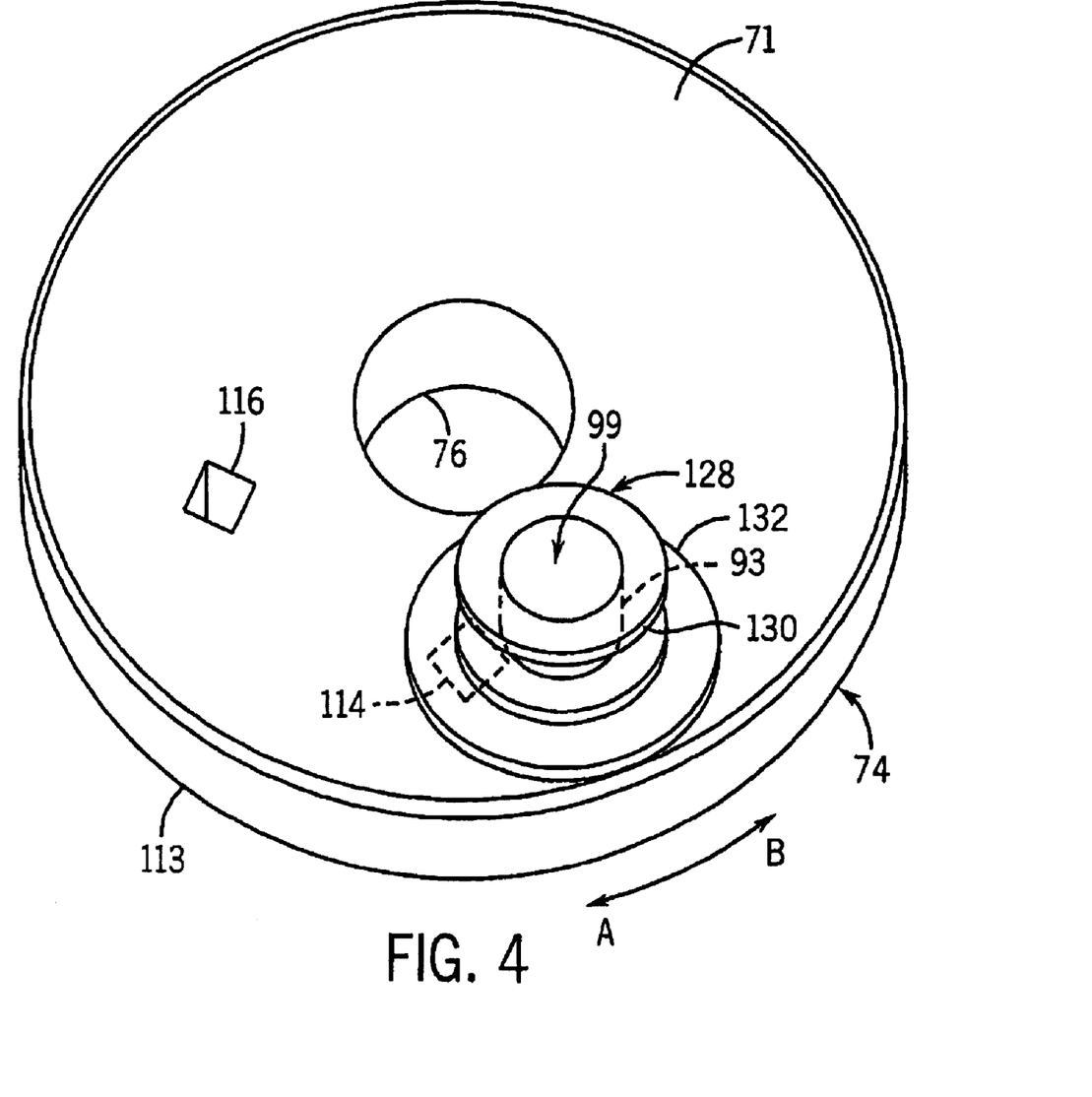
FIG. 4 is a perspective view of a portion of the control valve illustrated in FIGS. 1-3, looking at the lower surface of the valve disc, with the valve in a metered flow position.

Referring now to FIGS. 3 and 4, fluid flow is directed between the various ports 96, 98, and 100, and drains 112 and 115, via rotating valve disc 74. Specifically, first and second apertures 114 and 116, respectively, are formed vertically into the undersurface 71 of disc 74 and terminate before extending through to the upper surface 75. The terminal ends (not shown) of apertures 114 and 116 are connected via a nested channel 118 (see also FIGS. 5-8) that extends from circumferential wall 113 at a location proximal aperture 116, through apertures 116 and 114, and terminates at a location downstream of aperture 114 without extending entirely through disc 74. Channel 118 is sealed via a plug 120 disposed at circumferential wall 113, and places apertures 114 and 116 in fluid communication.

Apertures 114 and 116 can thus be selectively coupled in tandem to certain ones of ports 96, 98, 100, 112, and 115 in order to direct the hydraulic fluid flow as desired. For instance, when ports 98 and 100 are coupled via apertures 114 and 116, hydraulic fluid will flow from source 109 through port 100, and subsequently through channel 118, which links ports 100 and 98. The pressurized fluid will then flow through port 98 and to port 31 to extend load 33. If port 96 is coupled to either drain 112 or 115, hydraulic fluid will flow from port 31, through port 96 and channel 118, where it will then flow into whichever drain 112 or 115 is coupled to port 96, thereby retracting the load 33.

With continuing reference to FIGS. 3 and 4, it is appreciated that disc 74 and valve housing 44 are preferably formed from a metal or other suitably strong material to withstand the high pressure associated with the hydraulic fluid, and that the ports 96-100 alone are therefore incapable of forming a seal with the metal undersurface 71 of disc 74. Accordingly, ports 96-100 are sealed against the undersurface 71 of disc 74. In particular, ports 98 and 100 interface with disc 74 via a metering assembly 110, while port 96 interfaces with disc 74 via a non-metering sealing assembly 111.

FIG. 3 illustrates an assembly view of metering assembly 110 being installed in conjunction with port 98, while port 100 is illustrated with metering assembly 110 already installed. Metering assembly 110 includes a vertically extending coil spring 122 that is disposed at the lower end of the assembly. A sealing o-ring 124 is sandwiched between a pair of washers 126 in a groove formed around the outside of a gasket 128. The gasket 128 is biased towards the undersurface of disc 74 under the force of spring 122 and also any hydraulic pressure urging it upwardly. Referring also to FIG. 4, gasket 128 includes a vertically extending annular body 93 defining a flow path 99 there through. A lower flange 130 seats against spring 122, and an upper flange 132 forms a sliding seal against the lower surface 71 of disc 74.

Upper flange 132 of metering gasket 128 has a radial width sufficient to completely cover and seal apertures 114 and 116 during operation when the apertures 114 and 116 are positioned over flange 132. Gasket 128 can thus seal the undersurface of disc 74 or, alternatively, determine the degree of alignment between flow path 99 and apertures 114 and 116 to control the flow rate of hydraulic fluid through the corresponding port between completely closed and completely open positions. Gasket 128 is preferably made of a metal or other like material, with sufficient surface flatness and finish at the upper flange 132 suitable for forming a reliable high pressure hydraulic seal against lower surface 71 of disc 74 under the force of spring 122, yet sill allowing sliding of disc 74 as it is rotated.

As described above, load return port 96 interfaces with the undersurface 71 of disc 74 via a non-metering sealing assembly 111. Sealing assembly 111 includes spring 122, o-ring 124, and washers 126 as described above with respect to metering assembly 110. A standard shear seal in the form of gasket 129 is disposed above the upper washer 126 and biased towards the undersurface 71 of disc 74 under the force of spring 122. However, gasket 129 differs from metering gasket 128, as the upper flange 131 of gasket 129 has a radial width less than the size of the openings 114 and 116. Gasket 129 is thus incapable of completely covering apertures 114 and 116, and thus can not meter the flow of fluid returning to reservoir 37 between completely closed and completely open positions. It should be appreciated, however, that load return port 96 could alternatively interface with disc 74 via a metering assembly 110, if desired, in order to control the flow rate of hydraulic fluid from load port 41 and the corresponding rate of load retraction.

FIG. 4 illustrates the interface between port 98 and aperture 114, it being appreciated that the interface between either port 96 and 98 and either aperture 114 and 116 is similarly metered. During operation, metering assembly 110 can prevent fluid from flowing through port 98 by rotating disc 74 to a position whereby flange 132 completely covers aperture 114. Disc 74 can then be rotated via handle 53 in the direction of Arrow A in order to begin fluid flow through port 98. In particular, as disc 74 is rotated, flow path 99 is brought into partial alignment with aperture 114. As disc 74 is further rotated, a greater portion of aperture 114 is brought into fluid communication with flow path 99, thus enabling a greater fluid flow rate through port 98, until the entire aperture 114 is aligned with flow path 99 to enable fill fluid flow.

As illustrated, apertures 114 and 116 are diamond-shaped with respect to flange 132 as disc 74 is rotated in order to easily meter fluid flow at a desired rate. A diamond shape is preferable because the amount of overlap between apertures 114 and 116 and flow paths 99 can be finely controlled at low flow rates (i.e., positions near the fully closed position). It should be appreciated, however, that apertures 114 and 116 could alternatively assume any desired shape that enables the flow of fluid flowing through the disc 74 to be metered in accordance with the present invention. The term "geometric aperture" is thus intended to encompass shapes such as a diamond, square, rectangle, circle, triangle, quadrilateral, and other like shapes. Preferably, however, the front portions apertures 114 and 116 that initially engage flanges 32 taper to enable low flow rates to be easily metered.

The operation of valve assembly 72 will now be described in more detail with reference to FIGS. 5-8.

Figure 5A:
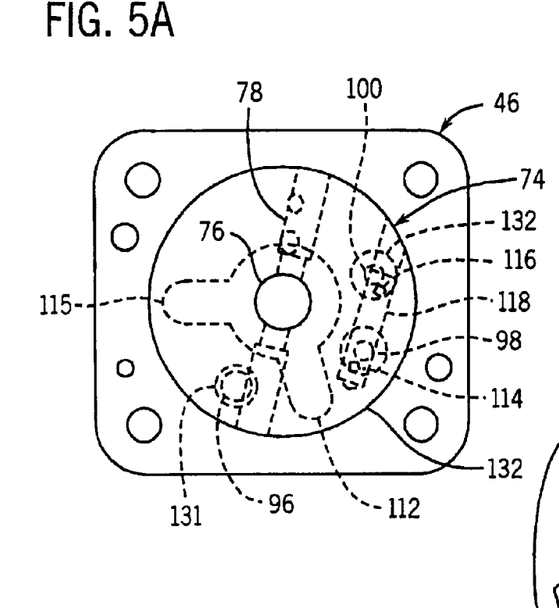
FIG. 5a is a top plan view of a valve member taken along line 5a-5a illustrated in FIG. 2 showing the valve member in a "no flow" position.
Figure 5B:
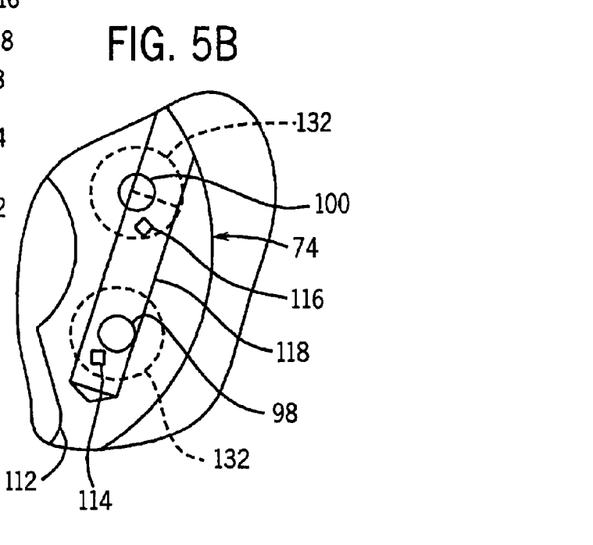

Referring initially to FIGS. 5A-5B, valve assembly 72 is illustrated in a "hold", or "no flow" position. In particular, handle 54 is rotated to correspondingly rotate disc 74 relative to valve block 46 until flange 132 of metering assembly 110 corresponding to port 100 completely overlaps aperture 116. Accordingly, pressurized hydraulic fluid flowing from source 109 through port 100 towards disc 74 is sealed against the undersurface 71 of disc 74 via metering assembly 110 and prevented from entering channel 118. Hydraulic fluid is thus prevented from traveling through aperture 114 to load port 41 via valve port 98.

Ports 100 and 98 are spaced such that flange 132 corresponding to port 98 preferably completely covers aperture 114 when valve 20 is in a "no flow" configuration, so it is closed even through check valve 108 prevents backflow from port 31 to port 98. Furthermore, flange 131 of sealing assembly 111 corresponding to load return port 96 is sealed against the undersurface 71 of disc 74 to prevent pressurized hydraulic fluid in an extended load cylinder from traveling through bypass channel 102 and into reservoir 37.

Placing valve 20 in a "hold" orientation enables power to source 109 to be discontinued while maintaining an extended load 33 over a prolonged period of time, thereby reducing wear and tear on the supply pump and valve assembly 72. It may also be desirable to rotate the valve assembly 20 to the "hold" orientation when load 33 is retracted and the hydraulic fluid source 109 is off in order to prevent fluid from immediately flowing to load 33 when power is subsequently supplied to the hydraulic fluid source 109. In order to gradually introduce pressurized hydraulic fluid to load 33, valve 20 may be positioned in a metering configuration, as will now be described.

Figure 6A:
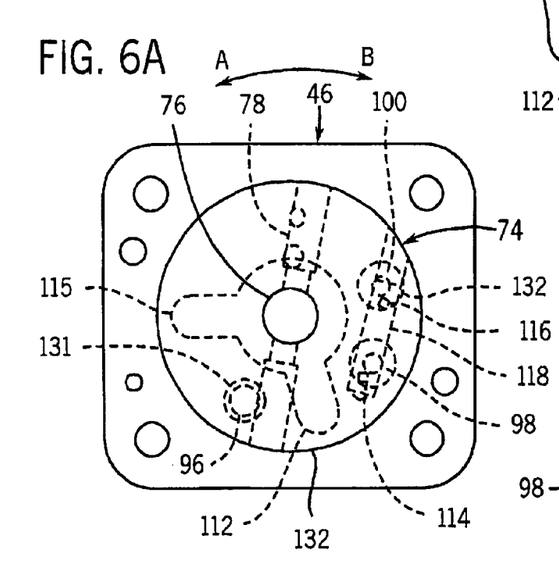
FIG. 6a is a view similar to FIG. 5a but with the valve member in a metered flow position.
Figure 6B:
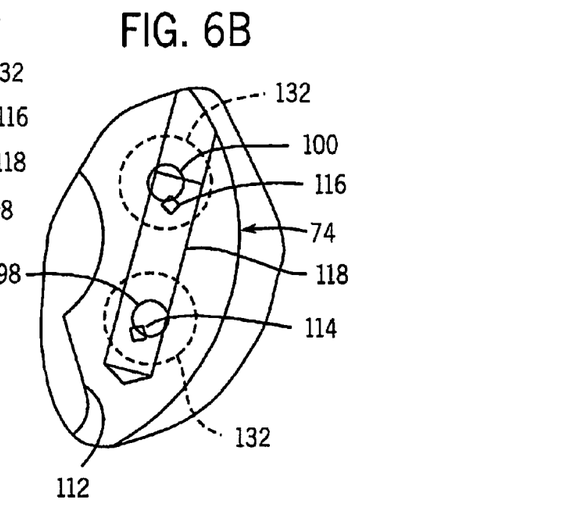

Specifically, referring again to FIG. 4 and also FIGS. 6A-B, disc 74 is rotated slightly counterclockwise in the direction of Arrow A (FIG. 6A) such that a portion of apertures 114 and 116 are removed from being covered by flanges 132 and instead are partially aligned with the corresponding flow paths 99 linking ports 98 and 100, respectively. Accordingly, a "metered flow" position is achieved whereby hydraulic fluid flows from source 109 between ports 100 and 98 via channel 118, and subsequently flows through check valve 108 toward port 31 and into load port 41. When a small portion of apertures 114 and 116 are aligned with ports 98 and 100, respectively, a slow metered advance of hydraulic fluid occurs. As apertures 114 and 116 become increasingly aligned with ports 98 and 100, hydraulic fluid flow to load 33 is correspondingly increased to initiate a rapid metered advance.

It should be appreciated that aperture 114 is preferably configured to be placed in fluid communication with port 98 slightly prior to aperture 116 being placed in fluid communication with port 100. As a result, a conduit from channel 118 to load port 41 is opened prior to pressurized hydraulic fluid entering channel 118 to help equalize the pressure in channel 118 to the load pressure prior to opening channel 118 to the source pressure. In addition, since the metered aperture at 116 is smaller than that of 114, more metering is occurring at port aperture 116 than at aperture 114, for more precise control. Alternatively, as described above, flanges 114 and 116 could be configured to engage ports 98 and 100 simultaneously, or to do so with 116 engaging first. Since there are two metered apertures, the total pressure drop between the port 100 and the port 98 can be divided between the two apertures so that, especially for high pressures, the pressure drop does not occur all at one aperture.

Figures 7A, 7B, 8A, 8B:
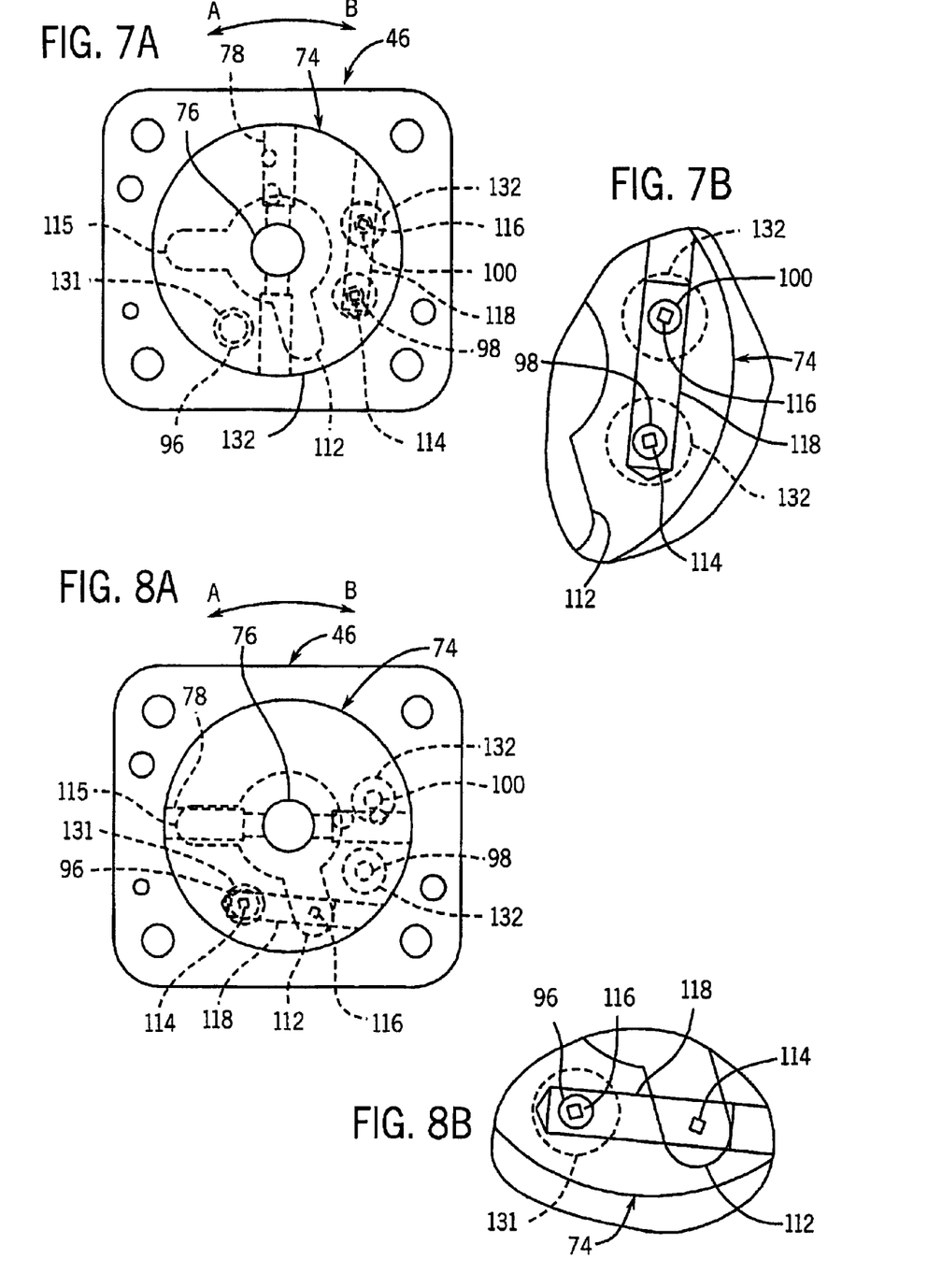

Referring now to FIGS. 7A and 7B, as disc 74 is further rotated counterclockwise, apertures 114 and 116 are brought into complete alignment with ports 98 and 100, which are sized to completely overlap the corresponding apertures 114 and 116 to enable full fluid flow through conduit 118 to port 31.

Markings 59 (See FIG. 1) can also be provided on handle 53 or disc member 52 that may be read by a user to determine the flow rate of the metered hydraulic fluid, whether flow is completely turned off (hold) and whether the load is connected to tank 37. For instance, if 50% of full fluid flow to load 33 is desired, the user would rotate handle 54 and disc member 52 to correspondingly place half of the surface area of aperture 116 in alignment with port 100. Once the load 33 has reached its desired extension, the valve 20 may be actuated to the "no flow" position discussed above, and power to hydraulic fluid source 109 may be discontinued. When moving to the no flow (hold) position, aperture 116 is closed first, followed by the closing of aperture 114. This assures that the pressure in channel 118 will be equalized to the load pressure in the hold position.

Although in the preferred embodiment, metering assemblies 110 are associated with both ports 100 and 98, in some applications only one of the ports 100 or 98 may need to be metered in order to sufficiently meter the flow of hydraulic fluid to load port 31. Specifically, if port 100 is metered, by way of the diamond shaped or other suitable geometric aperture in combination with metering assembly 110, and port 98 has a non-metering sealing assembly 111 installed, the hydraulic fluid flow could be metered when entering channel 118, and thus will also be metered when flowing to load 33 even if aperture 114 is filly open with respect to port 98. Likewise, if port 100 is non-metering, and port 98 is metered, full hydraulic fluid flow would enter channel 118, however the flow to load 33 would be metered because aperture 114 would be only partially aligned with port 98. Of course, sufficient clearance would need to exist to ensure that aperture 116 and port 100 are fully aligned when the valve disc 74 is further rotated to place aperture 114 in full alignment with metered port 98.

Referring now to FIGS. 8A and 8B, disc 74 may be rotated to a "return" or "retract" position whereby fluid is drained from load 33 and returned to the reservoir 47 via channel 104. In particular, aperture 114 is aligned with load return port 96 and aperture 116 is aligned with drain 112 (alternatively aperture 116 could be aligned with load return port 96 and aperture 114 could be aligned with drain 115 ). Accordingly, hydraulic fluid travels from load port 41 into manifold housing 22 via channel 106 and towards check valve 108. The returning fluid bypasses the check valve 108 via channel 102 and travels into disc 74 via port 96 and aperture 114. The hydraulic fluid then travels through channel 118 and exits disc 74 via aperture 116 and flows into groove 112 where it is directed to reservoir port 39 via channels 104 and 105.

It should thus be appreciated that the valve 20 in accordance with the preferred embodiment enables a user to both select the direction of fluid flow and meter in a continuous manner the flow of hydraulic fluid to a load using a single valve assembly 72. Valve 20 could also be modified to meter the flow of hydraulic fluid returning from port 31 to the reservoir 37 via channel 104, if so desired, by replacing standard sealing assembly 111 with a metering assembly 110. The invention is specifically adapted for high pressure hydraulic applications typically between 5000 and 10000 PSI. As used herein, high pressure refers to pressure greater than 5000 PSI. While the present system implements one fluid source and one load, it should be appreciated that any system implementing any number of fluid sources and loads may benefit from the present invention.

Furthermore, though the valve 20 described herein is configured for a single-acting cylinder, load 33 could alternatively be double-acting in accordance with the present invention. One skilled in the art would appreciate, for instance, that any number of apertures may be formed in disc 74 that may be connected by internal channels extending within disc to be selectively coupled to ports formed in valve block 46. The ports may have metering assemblies as described above or normal sealing assemblies depending on the desired function of the port.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. A metering valve assembly of the type that selectively directs hydraulic fluid under high pressure to a load, the valve assembly comprising:
    a valve block defining a first port that receives hydraulic fluid from a source, and a second port that directs hydraulic fluid to the load;
    a rotatable valve member having an axially facing surface in which first and second apertures are formed that are in fluid communication with each other, and that can be placed in selective communication with the first and second ports, respectively, to direct hydraulic fluid from the source the load;
    at least one metering sealing assembly that provides an interface between the valve block and the axially facing surface of the valve member, wherein the metering sealing assembly includes a gasket defining a flow path therethrough, wherein the gasket surrounds one of the first and second ports and defines a flange that abuts the axially facing surface of the valve member and that is sized to completely overlap and seal the corresponding aperture in at least one position of the valve member, and to provide continuously increasing communication between the flow path through the gasket and the corresponding aperture as the valve member is rotated toward a position in which maximum communication is provided between the flow path and the aperture;
    a second metering sealing assembly that provides an interface between the valve block and the axially facing surface of the valve member, wherein the second metering sealing assembly includes a tubular gasket that surrounds the other of the first and second ports and defines a flange that is sized to completely overlap and seal the corresponding aperture in at least one position of the valve member and to provide continuously increasing communication between the flow path through the gasket and the corresponding aperture as the valve member is rotated toward a position in which maximum communication is provided between the flow path and the aperture; and
    a drain extending through the valve block connected to a fluid reservoir, wherein the drain can be selectively aligned with one of the apertures.

2. A metering valve assembly of the type that selectively directs hydraulic fluid under high pressure to a load, the valve assembly comprising:
    a valve block defining a first port that receives hydraulic fluid from a source, and a second port that directs hydraulic fluid to the load;
    a rotatable valve member having an axially facing surface in which first and second apertures are formed that are in fluid communication with each other, and that can be placed in selective communication with the first and second ports, respectively, to direct hydraulic fluid from the source to the load;
    at least one metering sealing assembly that provides an interface between the valve block and the axially facing surface of the valve member, wherein the metering sealing assembly includes a gasket defining a flow path therethrough, wherein the gasket surrounds one of the first and second ports and defines a flange that abuts the axially facing surface of the valve member and that is sized to completely overlap and seal the corresponding aperture in at least one position of the valve member, and to provide continuously increasing communication between the flow path through the gasket and the corresponding aperture as the valve member is rotated toward a position in which maximum communication is provided between the flow path and the aperture; and
    a non-metering sealing assembly including a tubular gasket that surrounds the other of the first and second ports and defines a flange having a thickness less than the corresponding aperture.

3. A metering valve assembly of the type that selectively directs hydraulic fluid under high pressure to a load, the valve assembly comprising:
    a valve block defining a first port that receives hydraulic fluid from a source, and a second port that directs hydraulic fluid to the load;
    a rotatable valve member having an axially facing surface in which first and second apertures are formed that are in fluid communication with each other, and that can be placed in selective communication with the first and second ports, respectively, to direct hydraulic fluid from the source to the load;
    at least one metering sealing assembly that provides an interface between the valve block and the axially facing surface of the valve member, wherein the metering sealing assembly includes a gasket defining a flow path therethrough, wherein the gasket surrounds one of the first and second ports and defines a flange that abuts the axially facing surface of the valve member and that is sized to completely overlap and seal the corresponding aperture in at least one position of the valve member, and to provide continuously increasing communication between the flow path through the gasket and the corresponding aperture as the valve member is rotated toward a position in which maximum communication is provided between the flow path and the aperture;
    wherein one of the apertures is brought into communication with a corresponding port prior to the other aperture being brought into communication with the other port.

4. The metering valve assembly as recited in claim 3, further comprising a second metering sealing assembly that provides an interface between the valve block and the axially facing surface of the valve member, wherein the second metering sealing assembly includes a tubular gasket that surrounds the other of the first and second ports and defines a flange that is sized to completely overlap and seal the corresponding aperture in at least one position of the valve member and to provide continuously increasing communication between the flow path through the gasket and the corresponding aperture as the valve member is rotated toward a position in which maximum communication is provided between the flow path and the aperture.

5. The metering valve assembly as recited in claim 4, wherein the port that communicates with an aperture prior to the other port communicating with an aperture is the port in communication with the load.

6. A method of controlling high pressure hydraulic fluid flow between a source of high pressure hydraulic fluid and a load, the steps comprising:
(A) providing a stationary valve block having a first port coupled to the source and a second port coupled to the load;
(B) providing a rotatable valve member defining a first and second aperture in an axially facing face of the valve member and that are in fluid communication with each other;
(C) interfacing at least one of the ports with a metering assembly including a gasket defining a flow path there through and a flange at one end of the flow path that abuts in sliding contact the axially facing face of the valve member;
(D) rotating the valve member to a location whereby the flange completely covers at least one of the apertures to prevent fluid flow therethrough; and
(E) further rotating the valve member until the flow path is in continuously variable partial alignment with the aperture to enable a metered hydraulic fluid flow therethrough;
wherein step (A) further comprises providing a third port to facilitate a return of fluid from the load to a reservoir, wherein the third port is sealed with a non-metering sealing assembly.

* * * * *

UNITED STATES PATENT AND TRADEMARK OFFICE
CERTIFICATE OF CORRECTION

PATENT NO. : 7,503,344 B2 Page 1 of 1
APPLICATION NO. : 10/558120
DATED : March 17, 2009
INVENTOR(S) : Roger R. Pili et al.

It is certified that error appears in the above-identified patent and that said Letters Patent is hereby corrected as shown below:

Col. 1, line 8 change "is incorporated" to --is hereby incorporated--

Col. 1, line 27 change "and pneumatic" to --or pneumatic--

Col. 1, line 46 change "flow rate" to --fluid flow rate--

Col. 6, line 4 change "yet sill" to --yet still--

Col. 6, line 37 change "enable fill" to --enable full--

Col. 8, line 20 change "is filly open" to --is fully open--

Col. 9, claim 1, line 27 change "source the" to --source to the--

Signed and Sealed this

Thirtieth Day of June, 2009

JOHN DOLL
*Acting Director of the United States Patent and Trademark Office*